Oct. 27, 1970                    W. HAMPTON                    3,537,006
                    AIRCRAFT PROXIMITY WARNING DEVICE
Filed March 28, 1968                                    3 Sheets-Sheet 1
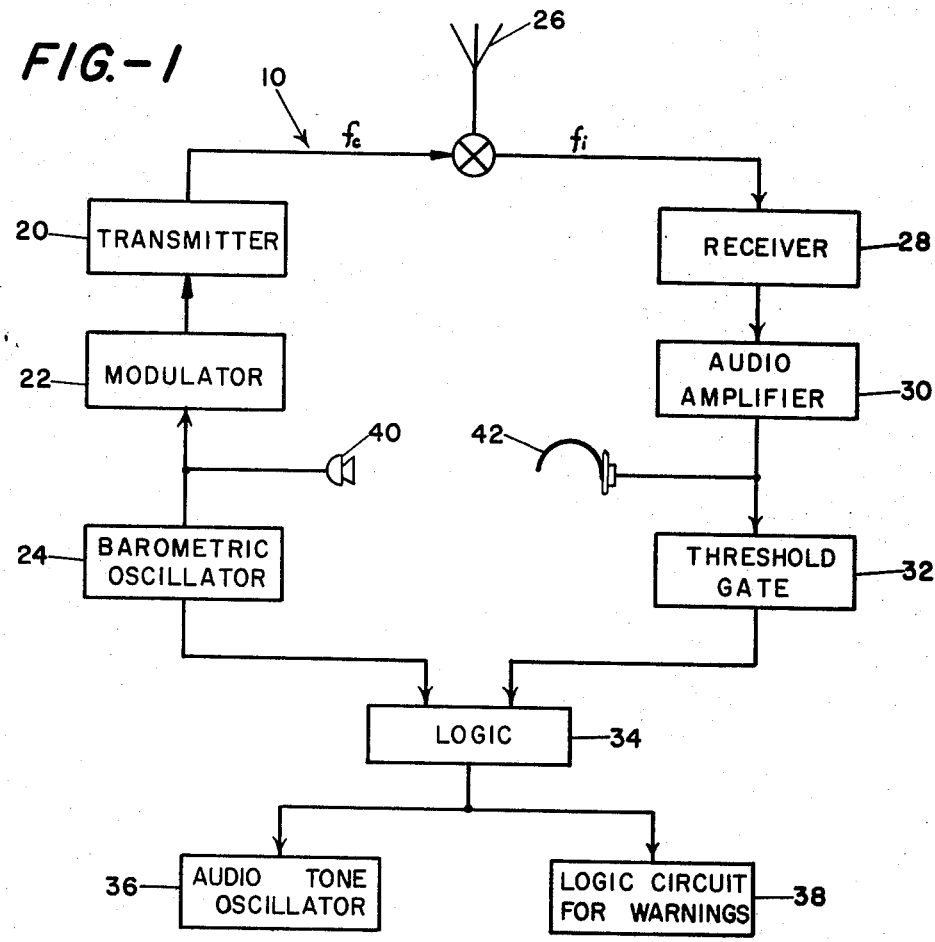
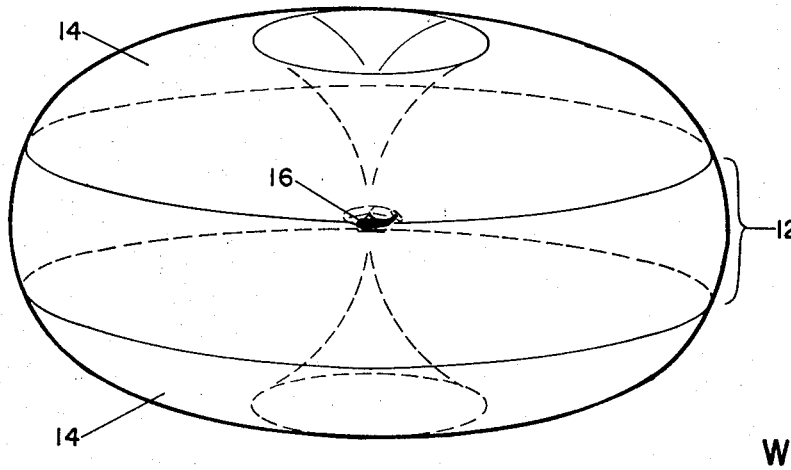
INVENTOR
WILLIAM HAMPTON
BY:
Oldham & Oldham
ATTORNEYS

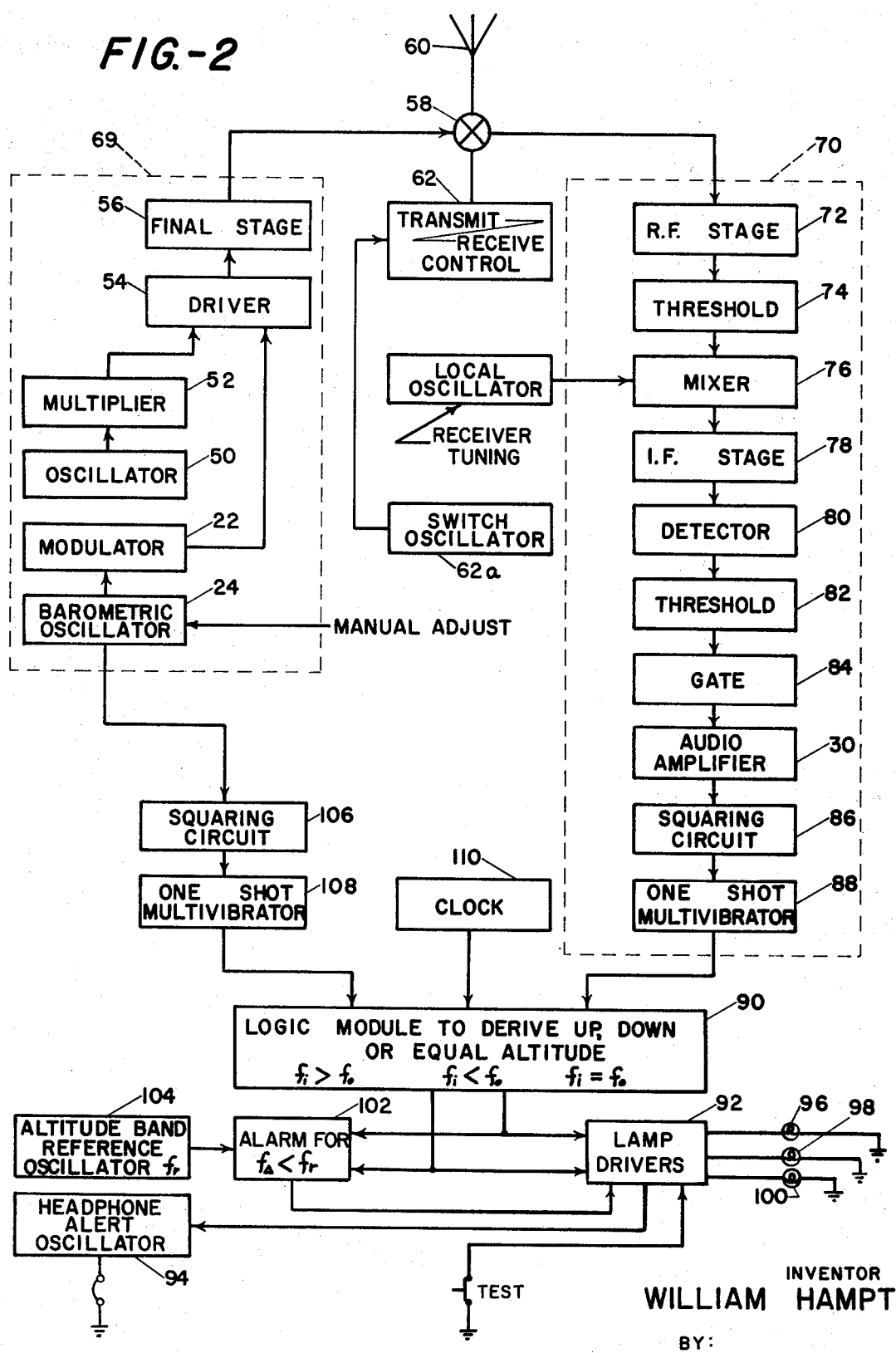

United States Patent Office 3,537,006
Patented Oct. 27, 1970

3,537,006
AIRCRAFT PROXIMITY WARNING DEVICE
William Hampton, Akron, Ohio, assignor to Goodyear Aerospace Corporation, Akron, Ohio, a corporation of Delaware
Filed Mar. 28, 1968, Ser. No. 716,892
Int. Cl. H04b *1/38, 1/46*
U.S. Cl. 325—29                                          9 Claims

ABSTRACT OF THE DISCLOSURE

A collision warning device in which each participating aircraft would have an identical unit which is self-contaned. The system consists of a combined transmitter and receiver, each operating on the same frequency, and where all aircraft systems would employ identical transmitted and received frequencies, all operating at all times. A barometric pressure capsule variably actuates an audio oscillator to generate an audio frequency related to pressure altitude, and wherein the audio tone is applied to a modulator to amplitude modulate the transmitter. The receiver accepts the radiation from similarly equipped aircraft by detecting a given audio tone level which determines a predetermined range, and is then fed to a logic where it is compared against a portion of the own craft transmitter barometer oscillator audio tone to determine difference frequency which is then compared by a logic module to determine the intruder's altitude relative to own craft, which in addition activates one or more warning devices.

Heretofore it is well known that there have been many and various attempts made to develop some type of aircraft collision warning device. However, these prior art attempts have been extremely expensive so as to be impractical to install in smaller aircraft. Further, they have overcomplicated the problem which has led to their increased expense. What is needed by the art is a low cost aircraft collision warning system available to all aircraft which is reliable and advises him of the area either up or down in which the emergency is occurring and gives the aircraft pilot sufficient time to react and avoid the potentially dangerous situation.

Therefore, it is the general object of the present invention to provide a collision warning system at low cost that can be made with available hardware and be unattended in operation and have adaptability to all aircraft.

It is a further object of the invention that the system be proportional to altitude, and have a visual and audio alarm that immediately alerts the pilot what action should be taken to avoid the dangerous condition.

The aforesaid objects of the invention and other objects which will become apparent as the description proceeds are achieved by providing in an aircraft collision warning apparatus the combination of a combined transmitter and receiver operating continuously on the same frequency, a barometric pressure audio oscillator generating an audio tone related to altitude, a modulator receiving the output of the audio oscillator and amplitude modulating the transmitter, means to detect the audio tone from a similar transmitter, amplify same and beat it in a mixed comparison to the tone of the audio oscillator, means to determine the frequency difference in the audio tones with reference to the tone of the audio oscillator, and logic means to evaluate the frequency difference and activate warnings in accordance therewith.

For a better understanding of the invention, reference should be had to the accompanying drawings wherein:

FIG. 1 is a basic block diagram depicting the fundamental operating components of the system to illustrate the preferred embodiment of the invention;

FIG. 2 is a more detailed block diagram illustrating the system in conjunction with the logic module necessary to determine when dangerous conditions are existing;

FIG. 3 is a perspective illustration showing the alarm zone and radiation zone generated around an aircraft equipped with the apparatus of the invention;

Figure 4:
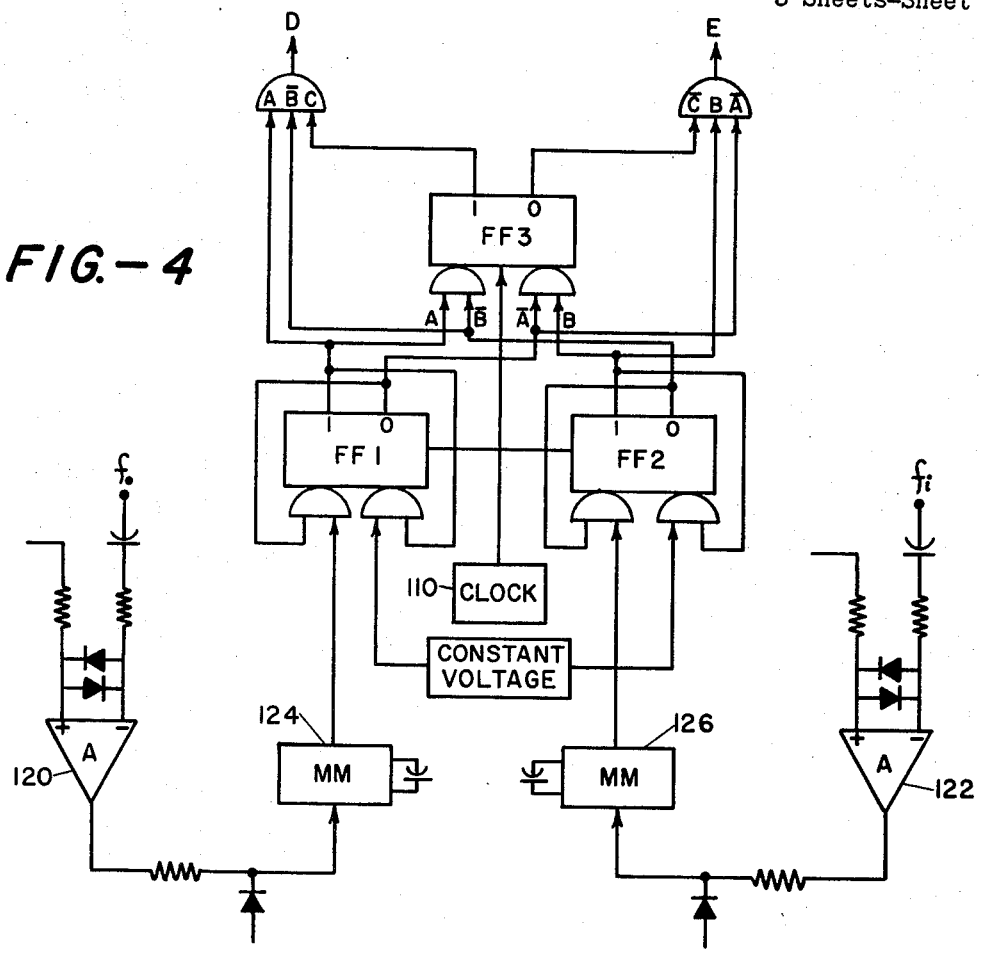
FIG. 4 is a block diagram of the different frequency comparator utilized in the logic module of the invention.

The invention relates to an aircraft collision warning system which provides an audible and visual signal indicating that one aircraft has entered a predetermined hazard volume airspace of another. Specifically, FIG. 3 shows the alarm zone 12 and a perspective representation of an electromagnetic radiation pattern 14 utilizing the equipment of the invention mounted on an aircraft 16. The system is based on a cooperative mode with each aircraft carrying identical transceivers. All the transceivers operate on a common carrier frequency. Each transmission contains altitude information of the transmitting aircraft in the form of an audio amplified modulation of the RF carrier. At a particular instant in time, each aircraft is either transmitting or receiving, as determined by electronic switching in their receiver.

With reference to the drawings, FIG. 1 is a basic block diagram of a respective collision warning system. The system shown in FIG. 1, indicated generally by numeral 10, comprises a transmitter 20 being driven by a modulator 22 which is amplitude modulated by a barometric oscillator 24. The transmitting antenna 26 sends out an RF carrier signal designated $f_c$. The barometric oscillator actually is a barometric pressure capsule which indicates aircraft altitude and is combined with an audio oscillator. This type of component is described in U.S. Pat. 2,596,-147. In effect, the oscillator generates an audio frequency $f_o$ related to altitude by pressure. The audio tone is applied to the modulator 22 which in turn amplitude modulates the RF signal $f_c$ from transmitter 20.

The receiver which forms a part of the component system is indicated by numeral 28 and the signals it receives from other aircraft is designated by symbol $f_i$. The signal from receiver 28 is passed into an audio amplifier 30, and thence to a threshold gate 32. The gate 32, by only accepting signals above a predetermined minimum, sets the maximum range level at which the equipment begins to determine aircraft proximity. The signal from gate 32 is sent to a logic module 34. The module 34 generates a signal representing the difference between the two input tones which is sent to a logic circuit 38, and also to an aural tone oscillator 36 to generate warning signals. The signal from oscillator 36 feeds the headset 42, if desired.

The transmitter and receiver are contemplated to be the conventional transmitter and receivers associated with an aircraft, and hence a microphone input 40 is provided on the transmitter side and a headset 42 is provided on the receiving side so that transmission and reception of any audio messages can take place in the normal manner with the tones of the barometric oscillator 24 and any received tones from oscillator 36 merely being applied to the background so as to give the pilot or aircraft operator a continuous tonal indication of any aircraft that might be entering the alarm zone or radiation zone of his transmitted, circular doughnut-shaped radiating and receiving pattern shown in FIG. 3 of the drawings.

FIG. 2 is a functional block diagram in greater detail than FIG. 1 of the basic components making up the system. The operation of the device is described briefly below to permit an understanding of the block diagram of FIG. 2. The barometric oscillator 24 generates an audio signal proportion to altitude that amplitude modulates the RF signal normally generated by an oscillator 50 driving through a multiplier 52 to a driver 54. The modulator 22 actuated by the barometric oscillator 24 modulates the RF signal in the driver section 54. Final RF adjustments are made in a final stage 56 before sending the signal through a switch 58 for transmission to an antenna 60 in accordance with the transmitter-receiver control unit 62. The nominal frequency of the barometric oscillator might change, as, for example, at a rate of 0.5 Hz. per foot of altitude change. The components in the block diagram following the barometric oscillator and utilized in generating the RF signal are elements of a conventional aircraft transmitter, and are indicated generally by dotted block 69.

The receiving portion of the unit is indicated by dotted block 70 and comprises an RF stage 72, a threshold circuit 74, a mixer 76, an IF stage 78, a detector 80, a second threshold circuit 82, a control gate 84, an audio amplifier 30, a squaring circuit 86, and a one-shot multivibrator 88. The receiver portion utilizes the threshold 74 to limit detection to a signal exceeding a given threshold level. The signal is passed on to a logic module indicated generally by numeral 90. The presence of any signal in the receiver, because of the threshold level indicators 74 and 82, automatically indicates the proximity of an intruder aircraft, whereas the audio modulation frequency automatically indicates the altitude of the intruder. Range detection is therefore contingent upon a predetermined signal at the receiver threshold. There is no angular detection since the up-down detection described hereinafter provides sufficient collision warning information to take avoiding action.

The threshold circuit actually comprises the two threshold blocks 74 (fixed) and 82 (variable), together with gate 84. The threshold circuit gates the audio signal to the logic section and thus performs the first logical choice, namely, the presence or absence of an intruder.

The following nomenclature is introduced to simplify the ensuing logic operation description:

$f_c$=carrier frequency (123.15 mHz.)
$f_i$=intruder modulation (6500 to 10,000 Hz.)
$f_o$=own-ship modulation (6500 to 10,000 Hz.)
$f_\Delta = f_o - f_i$
$f_r$=altitude band reference oscillator (nominally 144 Hz.)

The following logic operations must be implemented:

(1) If $f_i$ exists (has the threshold level been exceeded?)
(2) If $f_i$ exists, what is the absolute magnitude of $f_\Delta$?
(3) Is $f_\Delta$ greater or less than $f_r$?
(4) If $f_\Delta$ is less than $f_r$, then an intrusion exists and an alarm indication is called for.
(5) $f_\Delta$ is greater than $f_r$, no intrusion has occurred.
(6) If an intrusion occurs, is $f_i$ greater than $f_o$? If so, the intrusion has occurred from above.
(7) If an intrusion occurs, is $f_i$ less than $f_o$? If so, the intrusion has occurred from below.
(8) If an intrusion occurs, is $f_i$ equal to $f_o$? If so, the intrusion has occurred at equal altitude.

The above-listed logic operations are shown in block diagram form in FIG. 2. Logic operations are performed by digital integrated circuits that activate warnings such as a lamp and audio driver, indicated generally by numeral 92. The appropriate alarm signals either the headphone alert oscillator 94 or lamps 96, 98, or 100. The logic module 90 in effect determines frequency difference so as to derive up, down, or equal altitude indicated by the expressions shown in the block 90. These signals are sent to the driver section 92 and also to an alarm block 102 to determine if the intrusion has come from above or below in accordance with an altitude band reference oscillator 104, which is normally set to provide a band of approximately 300 feet in altitude above and 300 feet below the aircraft.

As explained more fully below, the logic module 90 which determines frequency difference must receive the audio tonal input from the barometric oscillator 24 and this is applied through a squaring circuit 106 and a one-shot multivibrator 108 to module 90. A clock 110 is provided to ensure proper timing of all information into module 90. The coordination of transmission and reception information over antenna 60 through control 62 is supplied by a switch oscillator 62a.

DESCRIPTION OF LOGIC MODULE 90

Figure 5:
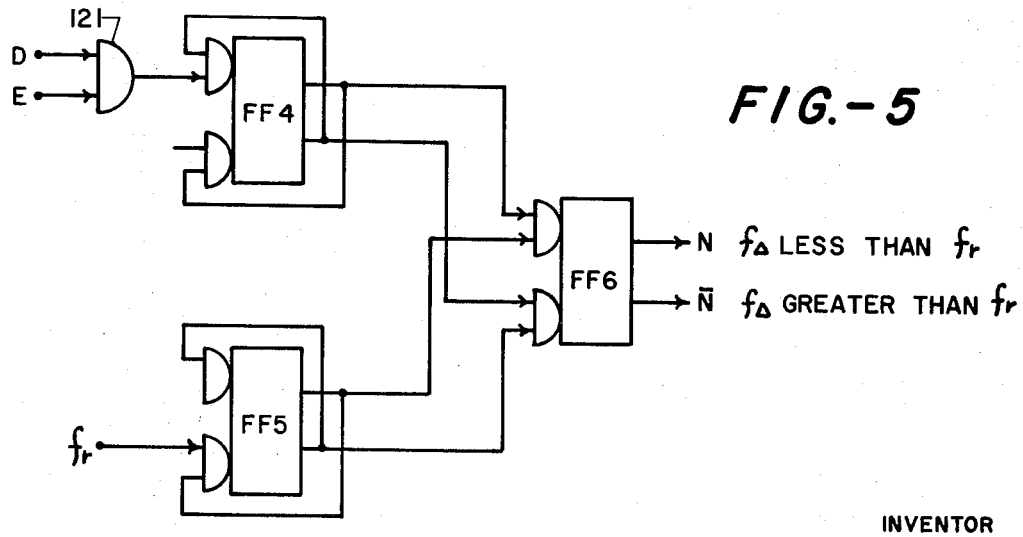
FIG. 5 is a block diagram of the limit frequency comparator utilized in the logic module of the invention.

In order to understand the operation of the logic in module 90, reference should be had to FIGS. 4 and 5. Specifically, the onboard barometric controlled oscillator and the received barometric controlled oscillator of the intruder are compared on a digital basis. Both are normally pulsating signals which are squared in the threshold circuit that provide response to input excursion beyond a predetermined level. The multivibrators 88 and 108, as shown in FIG. 2, are employed in each case to synchronize the pulse in terms of fixed clock which is a necessary requirement of the up-down frequency measuring circuit. Functionally, the module 90 is a frequency comparator that compares $f_i$ to $f_o$ and determines greater than and less than relationships.

In the logic circuitry the two frequencies $f_o$ and $f_i$ are compared and the difference frequency, $f_\Delta$, is generated on one output line if $f_i$ is the higher frequency, and on the other, if $f_o$ is higher. Conventional flip-flop logic circuitry is utilized to this end, as described hereinafter. Thus the frequency sense of one aircraft is established relative to the other and the up-down analomy is logically defined.

The system will not respond to the intruder's signals until it determines if the intruder has entered the hazard volume airspace shown in FIG. 3. This is accomplished by comparing $f_\Delta$ to an altitude band reference oscillator $f_r$ or by the comparison of block 104 and block 102 of FIG. 2. When $f_\Delta$ becomes less than $f_r$, the appropriate indicator lights will be activated and an audio tone will be applied to the pilot's headset.

FIG. 4 shows a detailed circuit schematic of the signal conditioning and frequency comparator with the difference frequency $f_\Delta$. Signals $f_o$ and $f_i$ are squarred by applying them to high/gain operation amplifiers 120 and 122 that are output limited to a level compatible with the logic employed. Mono-stable multivibrators 124 and 126 in each case are employed to create pulses with a duration greater than one period of the clock period. The frequency of the clock 110 is fixed at least twice as high as the highest possible value of either $f_o$ or $f_i$. There is no upper limit on the clock frequency for purposes of the logic scheme.

Each one-shot multivibrator 124 and 126 in the triggered state permits the subsequent clock pulse to set their corresponding flip-flop, FF1 and FF2. Tie back arrangements on FF1 and FF2 are incorporated to the AND gates associated therewith to make a JK type flip-flop which avoids ambiguity with equal inputs. The next clock pulse resets the flip-flops that were set, thereby establishing output pulses on A and $\overline{A}$ and B and $\overline{B}$ for each received pulse that is synchronized with the clock pulse. The timing set by clock 110 defines pulse train C, which is logically $A\overline{B}$ in order to obtain $f_\Delta$ on either line D or E.

The difference frequency, $f_\Delta$, thus is available on either line D or E, and is applied to a limit comparator circuit, the logic of which is shown in FIG. 5. The limit comparator circuit is included in block 102. This comparison circuit determines whether $f_\Delta$ is high or low with respect to the altitude band oscillator 104. If $f_\Delta$ is greater than $f_r$, $\overline{N}$ equals 1 and a signal is sent from block 102 to section 92 which causes the appropriate indicators to be activated. The logic includes JK type flip-flops 4 through 6 where the signal $f_r$ is applied to FF5 and D and E are applied through NAN gate 120 performing the OR function to supply $f_\Delta$ as an input to FF4. FF6 produces output signals N or $\overline{N}$ to confirm or deny that intrusion has occurred within the altitude danger band.

Thus, it is seen that the system of the invention is quite simple in incorporating a simple tone comparison into substantially conventional transmitter-receivers so that if a received signal exceeds a preset level, an intrusion is thereby detected. Logic operations performed on the altitude-derived audio modulation of the own-ship transmitter and the intruder signal yield up-down hazard direction information. One important feature of the invention is that altitude data supplied by their barometers provides an excellent means of defining one dimension, which is probably the most important dimension of an altitude collision situation, in a three-dimensional problem.

Limitation of the transmitter power output can restrict the system operation to those intruders within three to five miles, as a practical situation.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. An aircraft collision warning apparatus mounted in an aircraft, comprising:
    a radio transceiver; means to produce a variable audio frequency dependent on aircraft altitude, said signal being impressed on the voice signal transmitted by said transceiver for amplitude modulation thereof; threshold detection means to establish a minimum transmission reception level for the reception by said transceiver of audio modulated signals from other transceivers; means to compare the barometric audio signal with any audio modulated reception signal above the minimum reception level and to determine the frequency difference between such signals; and means to compare the frequency difference with the reference audio frequency to establish whether the audio modulated reception signal is above or below the altitude of the aircraft.

2. An apparatus according to claim 1 where the means to produce a variable audio frequency is a barometric pressure audio oscillator which signal is impressed on the transmitted signal for amplitude modulation thereof.

3. An apparatus according to claim 1 wherein the threshold detection means can be adjusted to vary the signal strength threshold of detection by the receiver of other audio modulated signals of substantially the same frequency.

4. An apparatus according to claim 1 where the transceiver operates continuously between transmit and receive and is continuously comparing received audio signals to the transmitted audio signal.

5. An apparatus according to claim 1 which includes means to set an altitude band above and below the aircraft at predetermined levels, means to produce a warning when another aircraft enters within the threshold range of the received signals and is within the preselected altitude band surrounding the aircraft.

6. An aircraft proximity warning device mounted in an aircraft which comprises, a transceiver which will transmit or receive on the same frequency, a barometric pressure audio oscillator furnishing an altitude dependent signal to said transceiver which signal is impressed on the transmitted voice signal for amplitude modulation thereof, means to detect an audio modulation on any received signals and compare the frequency thereof to the barometric audio signal and produce a signal representing the difference in frequency between said signals, and logic means to determine if the difference in frequency is within a predetermined range and altitude danger band with respect to said aircraft.

7. A device according to claim 6 which includes warning means actuated by the logic means which comprises an audio tone which changes in frequency depending on the proximity of another aircraft utilizing the same device, and means to visually indicate in a proximity situation if the other aircraft is above or below said aircraft.

8. A device according to claim 6 which includes means to determine a minimum strength to the received audio modulated signal, and means to determine if the frequency between the compared audio modulated signal falls within a predetermined altitude band above and below the aircraft.

9. In an aircraft collison warning apparatus the combination of
    a combined voice modulated transmitter and receiver operating continuously on the same frequency,
    a barometric pressure audio oscillator generating an audio tone related to altitude,
    a modulator receiving the output of the audio oscillator and amplitude modulating the voice modulated transmitter operating at the same carrier frequency and
    means to detect the audio tone from another similar transmitter, amplify same,
    means to determine the frequency difference in the audio tone detected and amplifier by last said means with reference to the barometric tone of the audio oscillator, and
    means to activate warnings in accordance with the frequency difference.

References Cited

UNITED STATES PATENTS

| 2,568,568 | 9/1951 | Stansbury | 325—29 |
| 3,341,812 | 9/1967 | Perkinson et al. | 325—29 |

ROBERT L. GRIFFIN, Primary Examiner

A. J. MAYER, Assistant Examiner

U.S. Cl. X.R.

325—13